US005248617A

United States Patent [19]

De Haan

[11] Patent Number: 5,248,617

[45] Date of Patent: Sep. 28, 1993

[54] PROCESSES AND APPARATUS FOR DETECTING THE NATURE OF COMBUSTION GASES

[76] Inventor: André P. De Haan, 35 Avenue Lemiez, Hyon - Mons, Belgium

[21] Appl. No.: 807,944

[22] Filed: Dec. 10, 1991

Related U.S. Application Data

[63] Continuation of Ser. No. 324,580, Mar. 16, 1989, abandoned.

[30] Foreign Application Priority Data

Mar. 21, 1988 [FR] France .............................. 88 03604

[51] Int. Cl.[5] ............................................ G01N 27/04

[52] U.S. Cl. ..................................... 436/137; 422/90; 422/94; 422/95; 422/98; 73/23.2

[58] Field of Search .................... 436/137; 422/90, 94, 422/95, 98; 324/464; 73/23.21, 23.25, 23.20, 24.06, 25.03; 338/34

[56] References Cited

U.S. PATENT DOCUMENTS 4,381,922 5/1983 Frey et al. ............................ 422/98
4,471,648 12/1984 Uchida et al. ...................... 73/25.03
4,642,601 2/1987 Sugawara et al. .................... 422/94

OTHER PUBLICATIONS

Patents Abstracts of Japan vol. 8 JP-A-59-125330.

*Primary Examiner*—Robert J. Warden
*Assistant Examiner*—Laura E. Collins
*Attorney, Agent, or Firm*—Ladas & Parry

[57] ABSTRACT

This invention relates to processes and apparatus for detecting the overall nature of combustion gases using a detector comprising a semi-conducting film of a metallic phthalocyanine which is deposited between two electrodes on an insulating wafer and which is placed in contact with the combustion gases and maintained at a temperature higher than a determined threshold, for example higher than 40° C. for a monoclinic copper phthalocyanine, in order to render the phthalocyanine insensitive to the water vapour contained in the combustion gases.

14 Claims, 5 Drawing Sheets

PROCESSES AND APPARATUS FOR DETECTING THE NATURE OF COMBUSTION GASES

This is a continuation of copending application Ser. No. 07/324,580 filed on Mar. 16, 1989, now abandoned.

FIELD OF THE INVENTION

The present invention relates to processes and apparatus for detection of a general nature of combustion gases with a view to optimalizing said combustion, and to applications of these.

BACKGROUND OF THE INVENTION

Detectors are known, that have a layer of metallic phthalocyanine for contact with the gases issuing from combustion, for example of an internal combustion engine, in order to measure an overall nature or proportions of the combustion gases. The electrical resistance of the layer of phthalocyanine, which is a semi-conductor, varies with the nature and proportions of the combustion gases, which depends, in turn, on the respective proportions of air and fuel combined in the combustion.

Such a detector emits an electrical signal which depends overall on the mixture of gases in the combustion gases and which may be used to indicate the ratio between the quantity of air and of fuel and/or to optimalize this ratio when the signal delivered by the detector is used in an open-loop which regulates the quantity of air or the quantity of fuel.

U.S. Pat. No. 4,381,922 describes a combustion detectors having an insulating plate, electrodes deposited on this plate and a thin layer of an amorphous or crystalline metallo-phthalocyanine deposited between said electrodes. The thin layer is composed of particles of iron-(II), iron(III), nickel, cobalt or copper phthalocyanine, which were suspended in a liquid solvent selected from the group of carbon tetrachloride, ether and acetone in order to be applied in the thin layer.

This Patent teaches in particular that suspending a copper or iron phthalocyanine for 24 hours in carbon tetrachloride or in a chlorinated solvent produces a compound having an electrical resistance that is ten times lower than that of the same metallic phthalocyanine not treated with the carbon tetrachloride or chlorinated solvent.

This Patent also teaches the use of a detector having such a sensitive layer of copper phthalocyanine treated with ether to monitor correct functioning of a burner. The curve of variation of the resistance as a function of excess combustion air passes through a fairly flat minimum near the stoichiometric proportions, however. Nevertheless the detector may be used for regulating the admission of air in to the burner.

It also is known that the conductivity of the phthalocyanines is also a function of the hygrometric degree of the atmosphere in contact with which they are placed. This property is used for constructing hygrometers based on phthalocyanines.

The electrical properties of the phthalocyanines are explained as follows. At ambient temperature and in the absence of gas absorbed on the surface, the phthalocyanines are semi-conductors of type p.

In the presence of gaseous molecules having an electron receiver effect, which is the case of the majority of oxygenated gases issuing from a combustion such as oxygen or oxides of nitrogen, sulfur or carbon, the formation of positive charge carriers is promoted. In fact, the transfer of an electron towards a molecule of phthalocyanine on which an oxygenated gas is adsorbed is facilitated by the electron receiver effect of the gas.

This property explains that the phthalocyanines may be used to detect the overall nature of the combustion gases.

On the other hand, water vapour is an electron donor gas which reduces the conductivity of the phthalocyanine. The positive charges are stabilized by the water vapour and the number of positive carriers capable of ensuring conduction decreases.

For sufficient water vapour contents, the semi-conductivity may become of n type.

The action of water vapour or of any other electron donor gas is manifested especially in the presence of a previously absorbed electron receiver gas. In that case, the adsorbed water vapour progressively annihilates the electron receiver effect of oxygen.

The gases produced by combustion, particularly by the combustion of hydrocarbons, forcibly contain water vapour which results from the combination of the hydrogen of the hydrocarbons with the oxygen of the air.

The foregoing brief statement shows that, in order to use phthalocyanines for qualitatively or quantitatively detecting the nature of the oxygenated gases resulting from a combustion, it is necessary to eliminate or considerably reduce the effect of the water vapour contained in the gases, otherwise the presence of water vapour will lead to variations in electrical resistance which do not correspond to the presence of oxygenated gases and which falsify the detection.

U.S. Pat. No. 4,381,922 teaches that, when a detector based on phthalocyanines is used for monitoring combustion in a burner in order to regulate the ratio between the quantities of air and of fuels, the detector is placed in a cell heated to a temperature of 95° C., in order to avoid condensation on the detector of water, coming from the combustion by maintaining the detector at a temperature higher than the dew point.

It is imperative that the detectors based on phthalocyanines be maintained at a temperature higher than the dew point. In fact, if conducting water condenses on the detector, the electrodes thereof are short-circuited and the electrical signal between electrodes is not a function of the nature of the combustion gases.

However, it is not sufficient to eliminate the condensation of water on the detector. The effect of the water vapour contained in the combustion gases which intervenes even in the absence of condensation must also be eliminated or considerably reduced.

U.S. Pat. No. 4,381,922 teaches that one of the problems encountered when detectors based on phthalocyanines are used, is the sensitivity thereof to the humidity of the atmosphere. It teaches a means for solving this problem which is to add silica gel or a molecular sieve finely ground and saturated with water in a mixture of phthalocyanines and of carbon tetrachloride used for manufacturing the detectors. The silica gel or molecular sieve powder then acts as a buffer which regularizes and stabilizes the reaction of the detectors to humidity.

FIG. 10 of said U.S. Patent shows that the logarithm of the resistance of a detector obtained by this process passes through a minimum for a value of the excess of combustion air close to stoichiometry, but this minimum is relatively flat, as indicated above. Such flattening of the curve of variation of the resistance near the minimum is due in particular to the addition of silica gel or a molecular sieve which fix the water. This causes the variations in resistance due to a change in composition of the gases to be masked by the action of the water on the phthalocyanines.

This slow variation of the resistance on either side of the minimum is not propitious to optimalization of combustion.

In fact, the water content fixed in the preparation which flattens the minimum of the curve representing the logarithm of the resistance as a function of the excess of air prevents the operational optimum from being distinguished. It has now been ascertained that the values of resistance are substantially identical at +3 and −3% of excess of air. This characteristic is highly detrimental to an optimalization of combustion as, at −3% (negative excess of air), the burner produces much non-burned carbon monoxide and hydrocarbon, which causes considerable pollution and runs risks of explosion.

SUMMARY OF THE INVENTION

Objects of the present invention are to provide detectors and processes based on phthalocyanines for detecting a general nature of combustion gases which contain water vapour, by eliminate the effects of the water vapour on the resistance of said phthalocyanines . This gives the curve which represents the variations in resistance of the detector as a function of the excess of combustion air a very sharp minimum peak which coincides with an excess of air corresponding to the optimum combustion of the burner in question. Each such detector has a layer of a metallic phthalocyanine between two electrodes, for placement in the combustion gases and an electrical circuit which is connected to the electrodes between which an electric signal is collected which varies as a function of the overall nature of the combustion gases, which itself varies as a function of the air/fuel ratio.

In the process, curves (e.g. straight lines) of variation of the resistance of the metallic phthalocyanine are determined plotted as a function of the reciprocal of the temperature thereof expressed in degrees Celsius for various hygrometric degrees of the gases, which curves present a point of convergence and said detector is maintained at a temperature higher than a minimum threshold, which may be slightly lower than the temperature corresponding to said point of convergence.

According to a preferred embodiment of the detector, the phthalocyanine is copper phthalocyanine and the temperature of the detector is maintained higher than a minimum threshold substantially equal to 40° C.

According to another embodiment, the phthalocyanine is cobalt phthalocyanine and the temperature of the detector is maintained at a minimum threshold substantially equal to 30° C.

According to a preferred embodiment, a detector according to the invention comprises, in known manner, a plate made of an insulating material, on which are deposited two electrodes and a film of a metallic phthalocyanine connecting the two electrodes together.

In a preferred embodiment of a detector according to the invention, the insulating plate further bears electrical heating resistors which are connected to a source of voltage.

The film of phthalocyanine is advantageously obtained by applying on said support a thin layer of a suspension of particles of metallic phthalocyanines in a solvent selected from the group of carbon tetrachloride, ether or acetone, in which a very small quantity of a hydrophobic material has been dissolved, preferably a liquid or solid alkane whose molecules comprise more than ten carbon atoms, for example paraffin oil.

The invention results in novel detectors comprising a semi-conducting layer of a metallic phthalocyanine connecting together two electrodes between which is collected an electric signal which depends on the composition of the oxygenated gases resulting from combustion in contact with which the detector is placed and which does not depend on the water vapour content of said gases.

The majority of solid, liquid or gaseous fuels used in burners or in internal combustion engines contain hydrocarbons of which the hydrogen combines with the oxygen to form water vapour. The phthalocyanines are very sensitive to water vapour which modifies the semiconductivity of the phthalocyanines by passing it from type p (electron receiver) to type n (electron donor).

The process according to the invention, according to which the temperature of the point of convergence of the curves each representing the evolution of the resistance of a sample of a determined metallic phthalocyanine is determined as a function of the reciprocal of the temperature expressed in degrees Celsius, when this sample of phthalocyanine is placed in contact with a gaseous atmosphere having a determined hygrometric degree, and the detector composed of this phthalocyanine is maintained at a temperature higher than a minimum threshold which is close to the temperature of said point of convergence and which may be slightly lower than this temperature, makes it possible to render the detector insensitive to the water vapour contained in the combustion gas and therefore to obtain an electric signal representative of the composition of the combustion gases, which depends on the air/fuel ratio.

With respect to the process described in U.S. Pat. No. 4,381,922, in which silica gel or a molecular sieve saturated with water was mixed with the phthalocyanine, in order to stabilize the reaction of phthalocyanine to humidity, the process according to the invention presents the advantage that the phthalocyanine conserves a high sensitivity to the variations in composition of the combustion gases and that the curve of variation of the resistance of the phthalocyanine as a function of the coefficient of excess of air presents a more acute minimum located in the domain of the coefficients of positive excess of air and corresponding to the optimum of combustion of the burner in question for a given charge, i.e. for a given output of fuel. It therefore enables a more precise regulation of the combustion to be obtained, i.e. to maintain the air/fuel ratio closer to the optimum of the burner.

Maintaining at a temperature higher than that of the point of convergence avoids the influence of the water vapour contained in the combustion gases, whilst U.S. Pat. No. 4,381,922 teaches placing the detector in a cell heated to a temperature of 95° C. in order to avoid condensation of water, which is a very different function. In fact, the water might quite simply have been trapped to avoid it condensing on the detectors and provoking a short-circuit.

By maintaining the temperature of the detector in the vicinity of or above the temperature of the point of convergence, the detector is rendered insensitive to the water vapour contained in the combustion gases, without seeking to avoid condensation which is not produced if the temperature is higher than the dew point corresponding to the hygrometric degree of the combustion gases or if the water which condenses partially is trapped.

The addition of a liquid or solid alkane in the solvent used for forming a suspension of particles of phthalocyanines further makes it possible to create around the grains of phthalocyanine a hydrophobic film which efficiently reduces the influence of the water vapour on the phthalocyanine.

BRIEF DESCRIPTION OF THE DRAWINGS

The invention will be more readily understood on reading the following description with reference to the accompanying drawings, which show, in nonlimiting manner, embodiments of devices according to the invention and graphs showing the variations in the resistance of copper phthalocyanine as a function of the temperature and the hygrometric degree. In these drawings.

DETAILED DESCRIPTION OF THE DRAWINGS

Figure 1:
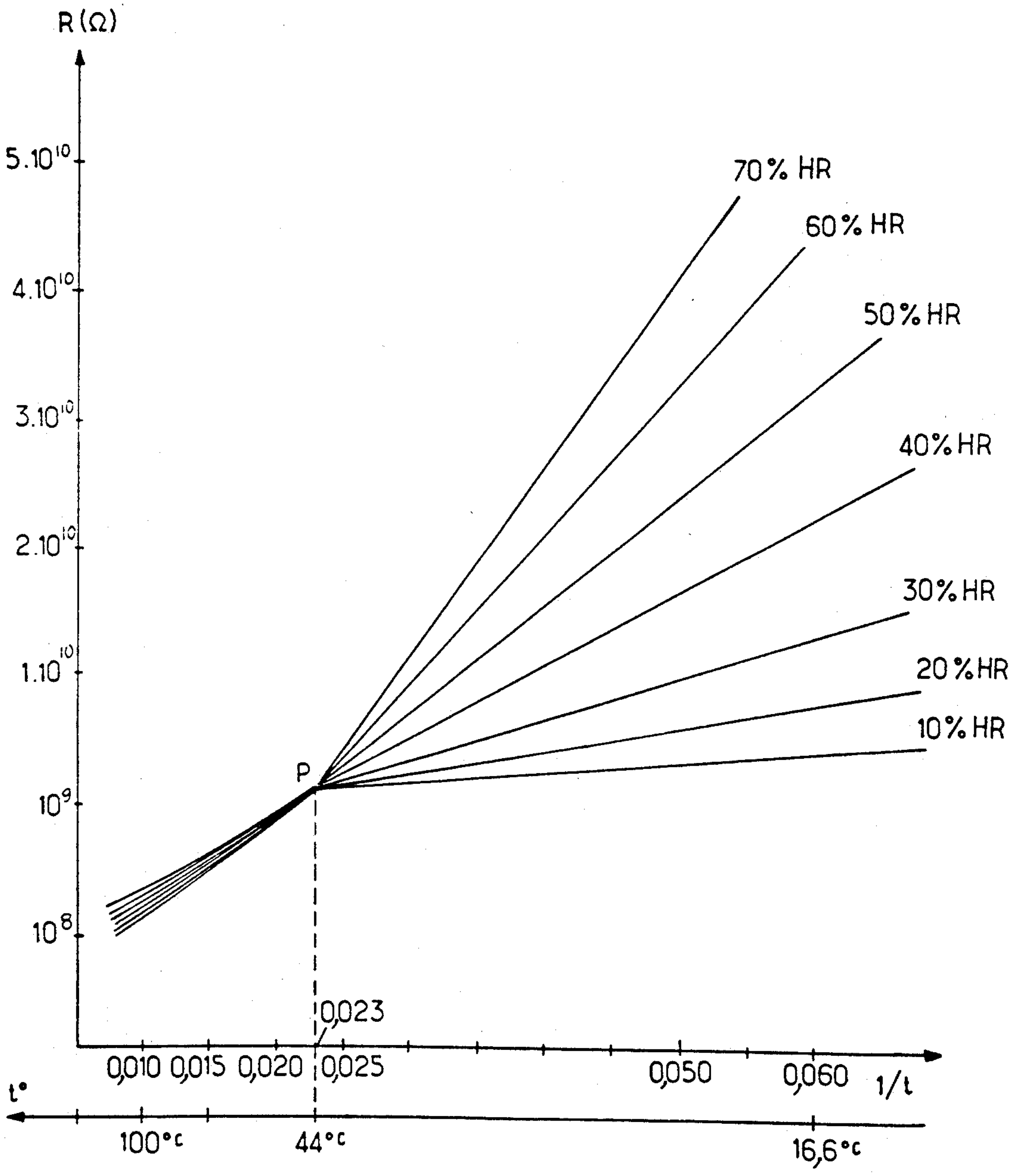
FIG. 1 is a graph which represents the curves of evolution of the resistance of a sample of phthalocyanine placed in a gas having a determined hygrometric degree, as a function of the reciprocal of the temperature expressed in degrees Centigrade.

FIG. 1 is a graph showing on the y-axis the resistance R expressed in ohms of a sample of copper phthalocyanine of type $\beta$ and on the x-axis the reciprocal 1/t of the temperature t° of the sample expressed in degrees Celsius.

The phthalocyanine of type $\beta$ corresponds to the monoclinic crystallographic form.

This graph shows the curves of variation of the resistance corresponding to different hygrometric degrees graduated between 10% and 70%. This graph shows that, for a determined hygrometric degree, the resistance varies linearly as a function of the reciprocal of the temperature and decreases when the temperature increases. It shows that the straight lines corresponding to different hygrometric degrees are concurrent at a point, called point P of convergence, which corresponds to a value of 1/t of the order of 0.023 or a temperature of the order of 44° C.

For values of 1/t lower than 0.023, i.e. for temperatures higher than 44° C., the straight lines substantially merge, which shows that the resistance no longer depends on the hygrometric degree.

The present invention is a practical application of this discovery to detectors based on phthalocyanines intended to emit an electric signal which indicates the nature of the combustion gases laden with water vapour without being influenced by this humidity.

This application consists in constantly maintaining the detector at a temperature higher than a value slightly lower than the temperature of the point of convergence P defined by the curves of FIG. 1.

For example, in the case of a copper phthalocyanine $\beta$, the temperature of the phthalocyanine is maintained higher than 40° C. The graph of FIG. 1 shows that, for 1/t<0.25, i.e. for t >40° C., the variations in resistance due to variations in hygrometric degree of the order of 20% remain slight and the electric signal delivered by the detector is therefore disturbed in negligible manner by the variations in hygrometric degree that are usually encountered.

Measurements of variation in the resistance as a function of the reciprocal of the temperature and of the hygrometry, effected on a sample of monoclinic cobalt phthalocyanine, show that straight lines are also obtained which converge at a point which corresponds substantially to a temperature of 36° C. and which substantially merge for higher temperatures. In the case of a detector composed of cobalt phthalocyanine, the temperature of the detector is maintained higher than about 30° C. and the effect of an evolution of the hygrometric degree of the combustion gases becomes negligible.

Figure 2:
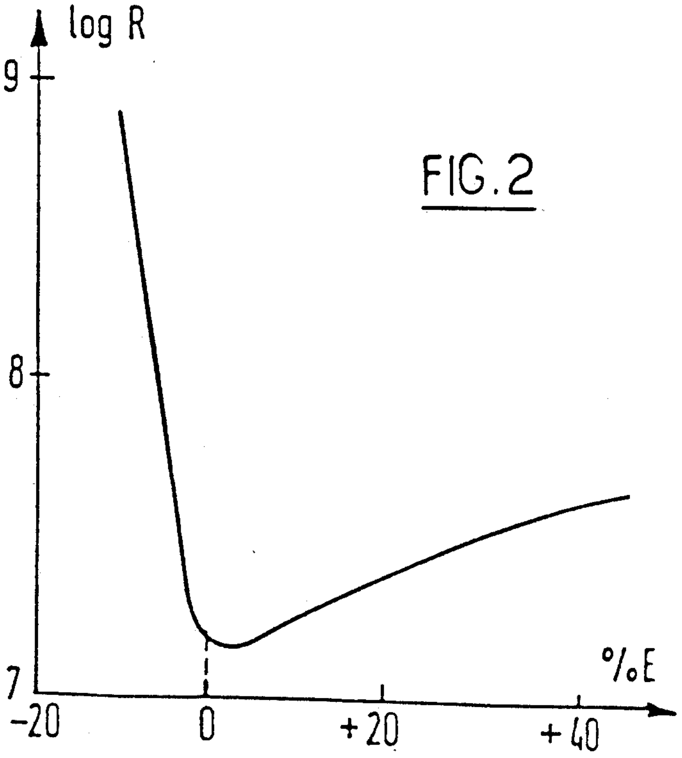
FIG. 2 represents the logarithm of the resistance (log R) as a function of the coefficient of excess of air expressed in percentage (E%) for a detector placed in contact with the gases of a combustion which burns with a determined excess of air.

FIG. 2 is a graph which represents the variations in the logarithm of the resistance R, plotted on the y-axis, of a sample of copper, cobalt or iron phthalocyanine, maintained at a temperature higher than that of the point of convergence as a function of the coefficient of excess of air E plotted on the x-axis.

It will be recalled that, in order to characterize the composition of the air-fuel mixture admitted to the burner, a parameter is used, called "coefficient of excess of air" E which is defined by the formula:

$$F = \frac{A - Ast}{Ast} \times 100$$

in which A is the output of air used and Ast is the output of air corresponding to an optimum combustion, i.e. to stoichiometric proportions.

For a total combustion for a perfect burner which in practice is unfeasible: E =0. In the event of lack of air, A is less than Ast and the coefficient E is negative.

FIG. 2 shows that the resistance of a detector composed of metallic phthalocyanine maintained at a temperature higher than a minimum determined as a function of the nature of the phthalocyanine and placed in contact with the gases of a combustion decreases very rapidly when the excess of air increases in the zone corresponding to a lack of air, passes through a minimum in the vicinity of optimum combustion, i.e. for slightly positive values depending on the burner and its charge, and increases again when the excess of air increases.

Figure 3:
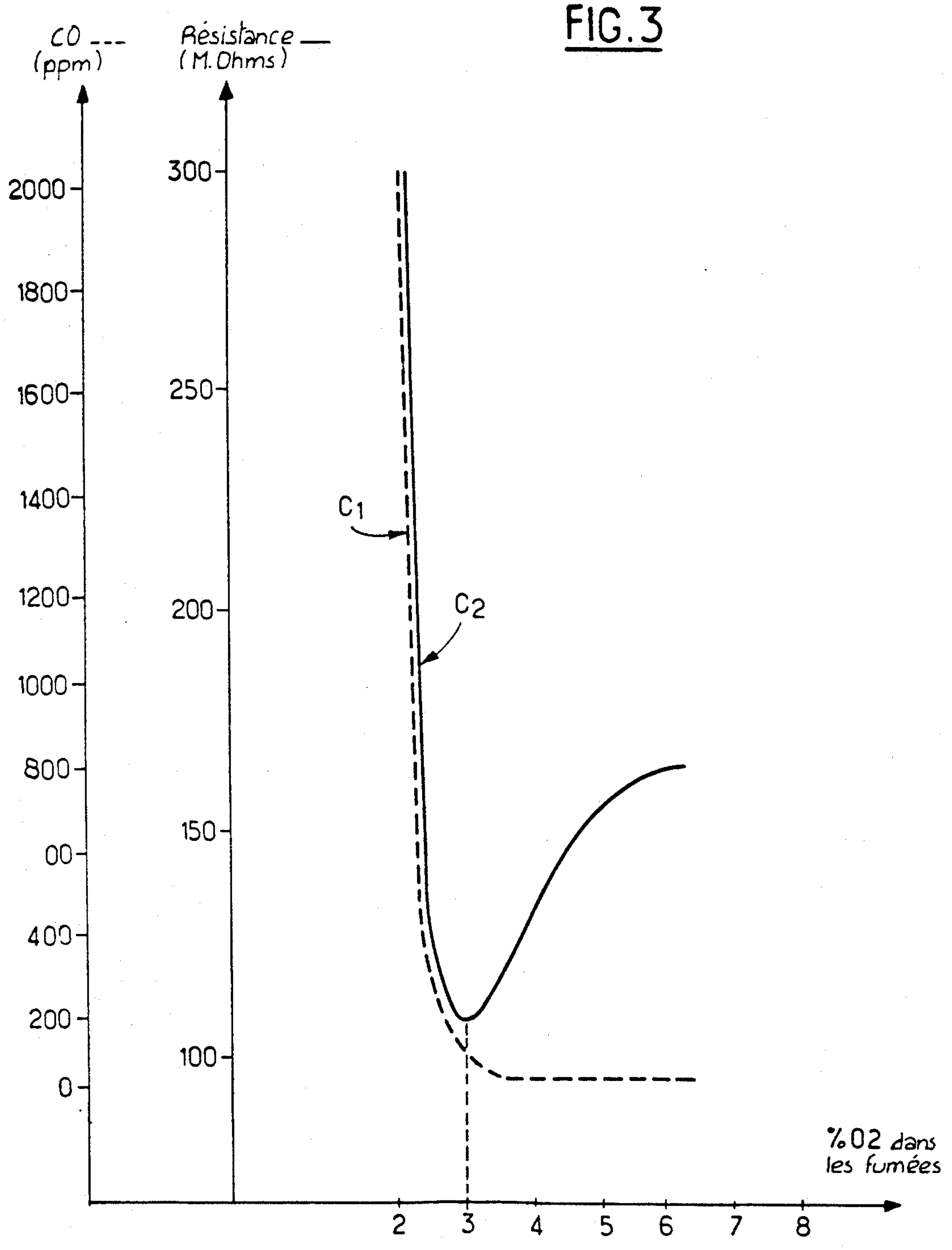
FIG. 3 is a graph which represents the variations in the carbon monoxide content and in the resistance of a detector according to the invention as a function of the oxygen content of the fumes.

FIG. 3 is a graph which represents values measured by means of a detector according to the invention, made of copper phthalocyanine, maintained at a temperature higher than 40° C. and placed in the fumes emitted by an industrial boiler burner, having a power of 9.3 MW.

Curve Cl in dotted lines represents the variations in the content of carbon monoxide (CO) expressed in part per million (ppm) as a function of the percentage of oxygen in the fumes.

Curve C2 in solid lines represents the concomitant variations in the resistance, expressed in megaohms, of the detector. This graph shows that the resistance of the detector presents a very accentuated minimum for an excess of air of the order of 3% which corresponds to the optimum combustion for which the carbon monoxide content attains a substantially zero value.

The curves of FIGS. 2 and 3 show that a detector according to the invention placed in contact with the gases of a combustion delivers an electric signal which varies very rapidly as a function of the coefficient of excess of air. On the other hand, the signal does not vary or varies very little as a function of the hydrometric degree of the combustion gases.

This signal indicates the quality of a combustion. It may be used for example for indicating whether a burner equipping a boiler, a furnace or any type of hearth is operating under good conditions. In that case, it suffices to fix a threshold higher than the minimum, to compare the signal emitted by the detector with this threshold and to trigger off an alarm signal when this threshold is exceeded in order to warn the user that the burner is operating under poor conditions due either to a lack or to an excess of air.

The signal delivered by a detector composed of metallic phthalocyanines placed in contact with the gases emitted by a combustion apparatus, for example by a burner or by an internal combustion engine, may also be used for automatically regulating the coefficient of excess of air and for maintaining it around the optimum value corresponding to the minimum of the value of electrical resistance.

Figure 4:
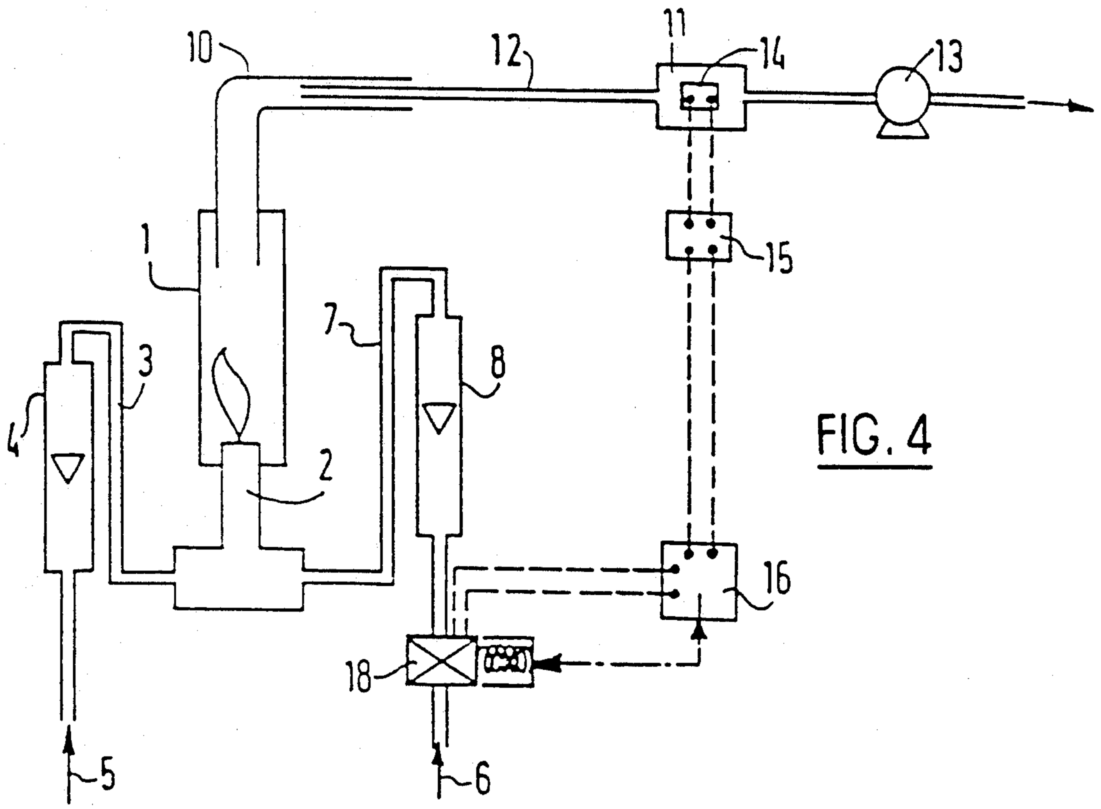
FIG. 4 schematically shows a detector according to the invention used for optimalizing operation of a burner.

FIG. 4 schematically shows an embodiment of a device according to the invention used for optimalizing the operation of a burner.

Reference 1 represents a combustion chamber, for example the hearth of a boiler, equipped with a burner 2 which is supplied with fuel, for example liquid or gaseous hydrocarbons, via a pipe 3 which is connected to a source of supply 5.

Pipe 3 may comprise a flowmeter 4 for measuring the flowrate of fuel. The burner 2 is supplied with combustion-supporting air via a pipe 7 connected to a source of air, for example a ventilator. Pipe may comprise a flowmeter 8.

The combustion gases leave chamber 1 via a so-called fume conduit 10. A conduit 12 is connected to said fume conduit and to the suction of a ventilator 13.

A chamber or enclosure 11 containing a detector 14 is placed on the path of conduit 12, with the result that the detector 14 is constantly in contact with combustion gases which are renewed.

Detector 14 comprises a semi-conducting area composed of a metallic phthalocyanine whose resistance varies as a function of the composition of the combustion gases and in particular, if no precaution is taken, of the water vapour contained in these gases.

The semi-conducting area is placed between two electrodes which are connected to a measuring apparatus 15 which emits a signal which varies with the resistance of the detector 14.

This signal is used in an open-loop comprising for example an electrical circuit 16 which automatically controls a means 18 for automatically adjusting the flowrate of air arriving at the burner via pipe 7 or the flowrate of fuel supplying the burner via pipe 3.

The electrical circuit 16 may be an analog regulator with derivative action.

If the derivative is negative, this signifies a lack of air and the regulator 16 then automatically increases the flowrate of air or it reduces the flowrate of fuel. If the derivative is positive, there is an excess of air and the regulator 16 automatically corrects. The electronic circuit 16 may also be a computer coupled to an analog-to-digital converter. In that case, the computer automatically returns towards the minimum the value of the resistance of the detector 14. To that end, it controls register 18 in one direction, for example that of increasing the flowrate of air and it compares the value of the resistance of the detector with a preceding value.

If the resistance has increased, one moves away from the minimum and the computer then controls a decrease in the flowrate of air.

If the resistance has decreased, one approaches the minimum and the computer continues to reduce the flowrate of air until it obtains a resistance greater than the preceding one.

Figure 5:
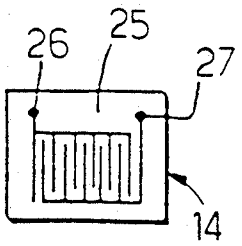
FIG. 5 shows an embodiment of a detector according to the invention.

FIG. 5 shows a preferred embodiment of the detector 14. This detector comprises an insulating support 25 which is for example a wafer of sintered alumina or epoxy resin or any rigid material, such as a plastics material coated with a film of aromatic anhydride and aromatic diamine copolymer marketed under the Trademark "KAPTON". The material of which the wafer 25 is composed has a very high resistivity, for example higher than $10^{15}$ Ω.cm, much greater than that of the phthalocyanine which constitutes the active layer.

Wafer 25 has a surface area of the order of one $cm^2$.

Wafer 25 bears two electrodes 26, 27 which have for example the shape of two combs whose teeth are parallel and intercalated. The electrodes 26, 27 may be deposited on the wafer by one of the techniques well known for making printed circuits.

On the wafer 25 provided with the two electrodes 26 and 27 there is deposited a thin layer of metallic phthalocyanine which is preferably a phthalocyanine comprising a central $Fe^{2+}$, $Fe^{3+}$, $Co^{2+}$, $Cu^{2+}$ or $Ni^{2+}$ ion.

The layer of phthalocyanine may be applied directly above the electrodes or directly on the support 25.

According to a preferred embodiment, the electrodes 26 and 27 are firstly printed on the insulating support 25. A small quantity of phthalocyanine powder is mixed with a solvent which is selected from the group constituted by carbon tetrachloride, ether or acetone.

10 g of metallic phthalocyanine per liter of solvent are mixed for example. The mixture is allowed to stand for about 24 hours. It is shaken in order to form a homogeneous suspension and a thin layer of this suspension is applied on the support 25. It is allowed to dry for about two hours at a temperature of 150° C. in order to evaporate the solvent, and is then compressed under a high pressure, for example a pressure of the order of $5.10^7$ Pa (500 bars). In this way, an electrical circuit is obtained between the electrodes which is constituted by a thin film composed of particles of phthalocyanine having a resistance which varies between $10^7$ and $10^9$ ohms depending on the composition of the gases in contact with which the film is placed.

According to another embodiment, there is deposited on the insulating wafer a thin film of metallic phthalocyanine by evaporation in vacuo, i.e. by sublimation. Such in vacuo deposit is effected for example by heating the phthalocyanine to a temperature of the order of 350° C., under a reduced pressure of the order of 0.1 Pas ($10^{-3}$ mbars).

In order to avoid the influence of the water vapour on the detector 14, the latter is maintained at a temperature constantly higher than a threshold determined as a function of the nature of the phthalocyanine used, for example a temperature higher than 40° C. for a copper phthalocyanine or higher than 30° C. for a cobalt phthalocyanine.

One means for maintaining the temperature of the detector higher than the desired threshold consists in providing the insulating wafer 25 with a heating resistor which may for example be a resistor printed on the back of the wafer and connected to a source of voltage.

A layer of conducting varnish paint may also be applied on the back of the wafer, or a thin metallic film may be deposited on the back of the wafers by sublimation.

Another means for maintaining the temperature of the detector higher than a threshold consists in placing the detector 14 in a chamber 11 of which the temperature is regulated in order never to descend below the fixed threshold.

In the application according to FIG. 3 where the detector 14 is placed on a pipe 12 connected to the fume conduit 10, it suffices to place the connection sufficiently close to the hearth, where the gases are sufficiently hot, so that the temperature of the gases passing through the chamber 11 is always higher than the desired threshold.

If sufficiently hot gases are not available, a small electric radiator may be placed in chamber 11 which sends to the detector 14 an infra-red beam whose intensity is sufficient to maintain the temperature above the fixed threshold.

In order to strengthen the insensitivity of a detector 14 based on phthalocyanines to water vapour, another means consists in treating the phthalocyanine in order to block it on a conductivity of type p.

A process for preparing a detector 14 in which a suspension of particles of phthanocyanines in a solvent which is preferably carbon tetrachloride, is formed, has been set forth hereinabove.

In that case, some grams/liter of a hydrophobic body, which is preferably a liquid or solid alkane whose molecules contain more than ten carbon atoms, are dissolved in this solvent. For example, some milliliters of a liquid alkane per liter of solvent are added.

When a film of this suspension is applied on the insulating wafer 25, a thin layer of particles of phthalocyanine which are impregnated on the surface with an extremely thin film of a hydrophobic material, for example paraffin, is obtained after evaporation of the solvent. The hydrophobic properties of this material prevent any adsorption of water, both in the gaseous and liquid state by the phthalocyanines. On the other hand, experience has shown that this film does not prevent the oxygenated electron-receiver gases such as $O^2$, NOx, $SO_2$.$CO_2$ from being adsorbed on the surface of the phthalocyanines. This results in the semi-conductivity of the phthalocyanine remaining blocked on type p and the resistance at the terminals of the detector no longer depending on the water vapour present in the gases.

The consequences of this treatment are very important:

only the electron-receiver gases present in the combustion gases have an action on the electric signal emitted by the detector;

the values of the resistance of the detector are lower as the resistance increases with the content of water adsorbed.

This point is important as it is difficult to measure a high resistance in an industrial environment.

Manufacture of the detectors and control of manufacture are facilitated as the resistance of the detectors no longer depends on the hygrometric degree of the control premises.

Modifications of the percentage of relative humidity due to the variations in temperature can be disregarded and therefore the parasitic effect of the temperature variations can be partially disregarded.

The responses obtained are more uniform from one combustion to another since the effect due to the variations in temperature is more reduced and the minimum of the signal corresponds to the optimum of the burner in question.

Figure 6:
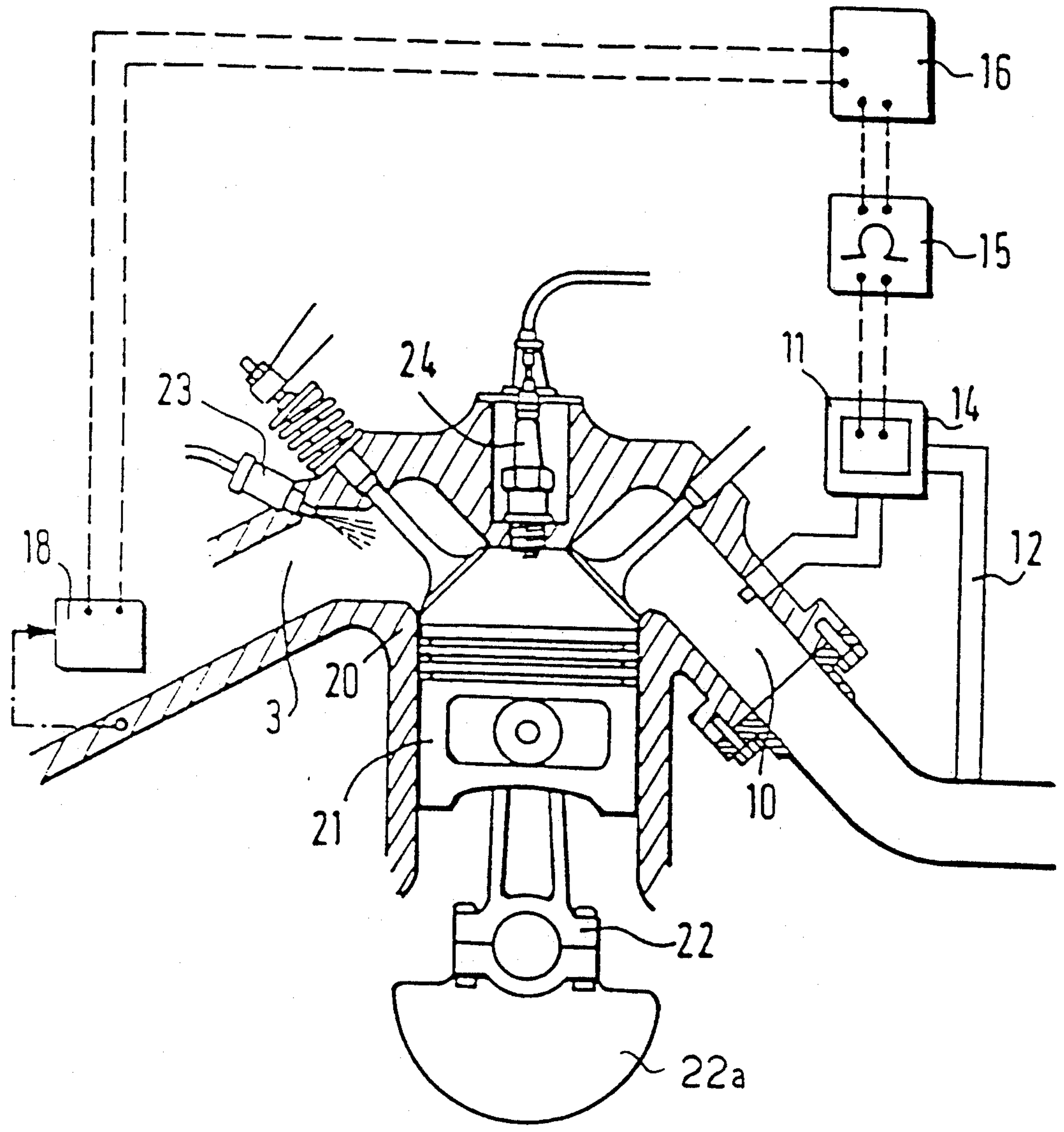
FIG. 6 schematically shows a detector according to the invention used for optimalizing an internal combustion engine.

FIG. 6 schematically shows an application of a detector based on metallic phthalocyanine for regulating correct combustion of an internal combustion engine. The Figure shows one cylinder 20, a piston 21 and the rod 22 which connects the piston to the crankshaft 22*a*. The elements corresponding to those of FIG. 4 are designated by the same references.

Reference 3 designates the supply of fuel which is ensured for example by an injector 23. Reference 10 represents the exhaust conduit. Reference 24 represents a spark plug. The detector 14 is placed in a chamber 11 which is interposed in a conduit 12 branch-connected on the exhaust conduit 10. The regulator 16 controls a means 18 for regulating the admission of air which is for example a motorized throttle valve placed in the admission conduit.

In a variant, the regulator 16 may control the fuel injection pump.

Figure 7:
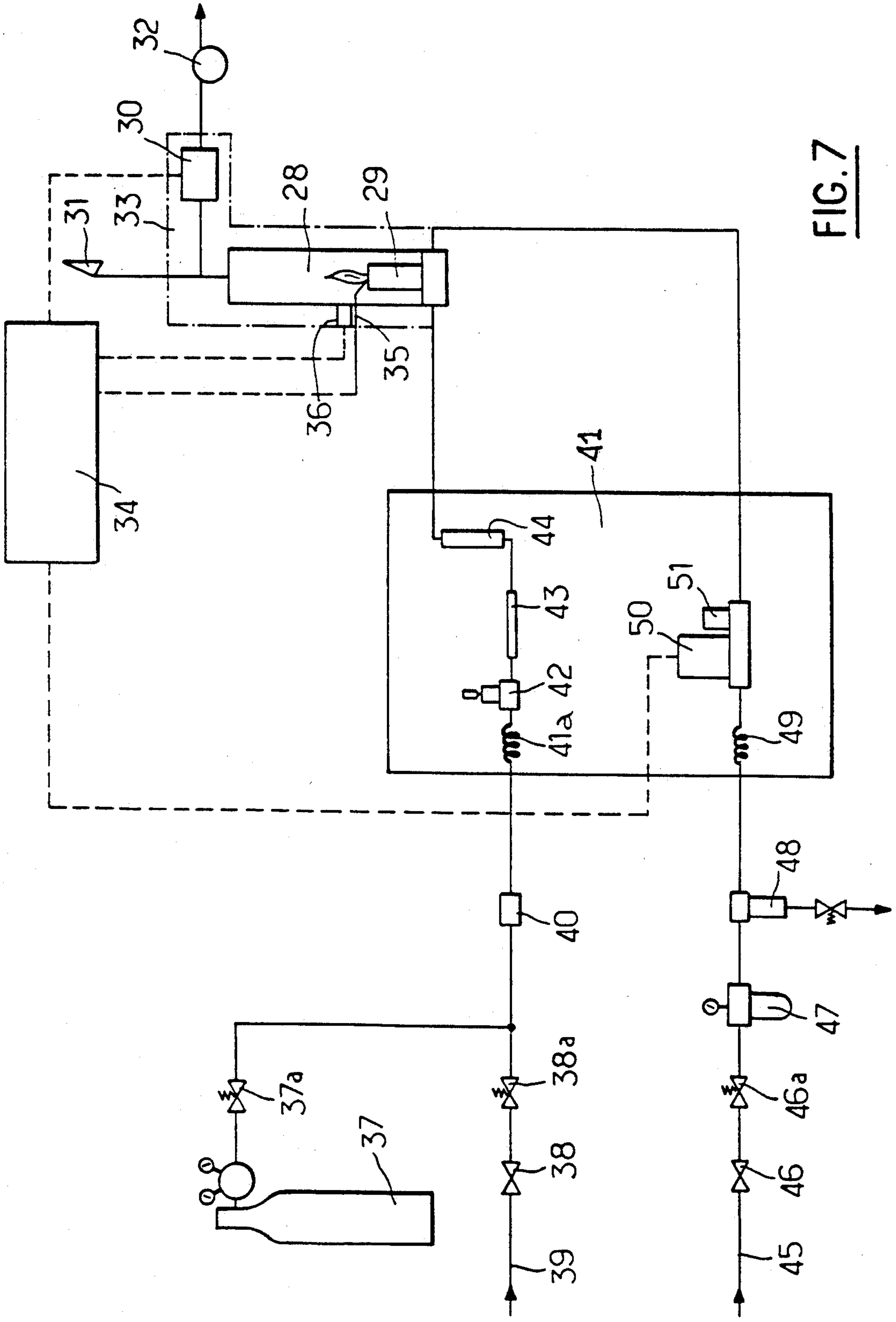
FIG. 7 schematically shows an installation for measuring the calorific power of a combustible gas using a detector according to the invention.

FIG. 7 schematically shows an installation for measuring the calorific power of a combustible gas.

The combustible gas distributed by a network to customers is invoiced for a determined calorific power.

FIG. 7 shows an installation enabling a customer to measure the real calorific power of the gas delivered.

Reference 28 represents a combustion chamber equipped with a small gas burner 29. Reference 30 represents a detector according to the invention based on metallic phthalocyanine which is placed in contact with the gases produced by combustion. Reference 31 represents a fume exhaust stack.

Detector 30 is placed in a conduit branch-connected on the stack which terminates in a sucking apparatus 32, for example a ventilator or a water-jet pump.

Detector 30 is placed inside a heat-insulated chamber 33.

The electric signal emitted by the detector 30 is sent to electronic circuits 34. The electronic circuits control an electrode 35 for ignition of the burner and receive a signal from a flame detector 36 which is for example a photo-electric cell.

Reference 37 represents a bottle containing a standard combustible gas, such as methane. The outlet conduit of the bottle 37 is fitted with an electro-valve 37*a*.

Reference 38 represents a stop valve which is placed in a pipe 39 connected to the distribution network of a combustible gas of which it is desired to check the calorific power. Reference 38*a* is an electro-valve. Reference 40 represents a filter. Reference 41 represents a heated chamber maintained at a constant temperature which is for example 45° C.

The gas pipe 39 passes through chamber 41 and it comprises, inside this chamber, a coil 41 a a pressure regulator 42, a capillary tube 43 and a flowmeter 44. The outlet of the flowmeter is connected to the gas supply of the burner 29.

Reference 45 represents an air pipe which is connected to a source of compressed air, for example a compressor.

Pipe 45 is equipped with a stop valve 46, an electrovalve 46*a*, a filter coupled to a pressure reducing valve 47 and a second, so-called coalescer filter 48.

Pipe 45 comprises, in its passage through chamber 41, a coil 49, a mass flow meter 50 and an automatic valve 51 for regulating the flowrate of air. The assembly formed by the mass flow meter 50 and the regulation valve 51 is connected to the electronic circuits 34. The pipe of air leaving chamber 40 is connected to the air supply of the burner 29. The outlet of the standard gas bottle 37 is branchconnected to the pipe 39.

Operation is as follows:

In a calibration phase, the burner is firstly operated by supplying it with standard gas and air and the detector 30 automatically regulates the position of the automatic valve 51 for combustion to be optimum, i.e. the air/fuel ratio to be equal to the optimum combustion of the burner for the standard gas in question. Knowing the stoichiometric air/fuel ratio of the standard gas, the deviation with respect to the stoichiometry due to the burner may thus be calculated and the installation may be calibrated.

The position of the automatic valve 51 is noted.

Once calibration is effected, the burner 29 is supplied with an unknown combustible gas. for example the gas delivered by a distribution network. The detector 30, in cooperation with the electronic circuits 34 and with the regulation valve 51, automatically regulates the flowrate of air to the optimum value corresponding to optimum combustion.

The position of the automatic valve 51 compared with the position that it occupied during calibration, indicates the quantity of air corresponding to the stoichiometric proportions for the gas to be checked and makes it possible to calculate the lower calorific power of this gas.

What is claimed is:

1. In a process for detecting a general nature of combustion gases that contain water vapor, the process comprising: providing a detector comprising a layer consisting essentially of metallic phthalocyanine for contact with combustion gases that contain water vapor, the layer connecting two electrodes, and circuit means for collecting an electric signal from the electrodes which varies as a function of the general nature of the combustion gases, and contacting the layer with the combustion gases to detect a general nature of the combustion gases with the circuit means, the improvement comprising:

predetermining a temperature corresponding to a point of convergence of curves of variation of resistance of the layer as a function of the reciprocal of its temperature in degrees Celsius for various hygrometric degrees of the combustion gases, and maintaining the layer at another temperature higher than a threshold temperature predetermined as a function of the phthalocyanine and lower than the temperature corresponding to the point of convergence, whereby to render the detector insensitive to the water vapour.

2. A detector for detecting a general nature of combustion gases that contain water vapor, comprising:

a layer consisting essentially of metallic phthalocyanine for placement in contact with combustion gases that contain water vapor;

a first electrode on a first portion of the layer and a second electrode on a second portion of the layer that is spaced from the first portion of the layer, whereby to be able to collect from the electrodes an electric signal that varies as a function of a general nature of the combustion gases; and thermal means for maintaining the temperature of the layer higher than a threshold temperature predetermined as a function of the phthalocyanine and lower than another predetermined temperature of the point of convergence of curves representing variations in resistance of the layer as a function of the reciprocal of its temperature expressed in degrees Celsius for different hygrometric degrees.

3. In a process for detecting a general nature of combustion gases that contain water vapor, the process comprising: providing a detector comprising a layer consisting essentially of metallic phthalocyanine for contact with combustion gases that contain water vapor, the layer connecting two electrodes, and circuit means for collecting an electric signal from the electrode which varies as a function of the general nature of the combustion gases, and contacting the layer with the combustion gases to detect a general nature of the combustion gases with the circuit means, the improvement comprising:

predetermined a temperature corresponding to a point of convergence of curves of variation of resistance of the layer as a function of the reciprocal of its temperature in degrees Celsius for various hygrometric degrees of the combustion gases; and maintaining the layer at a second temperature that is lower than 95° Celsius and higher than a threshold temperature that is predetermined as a function of the phthalocyanine, the threshold temperature being lower than the temperature corresponding to the point of convergence, whereby to render the detector insensitive to the water vapour.

4. The process of claim 3, wherein the phthalocyanine is copper phthalocyanine and the threshold temperature is about 40 ° C.

5. The process of claim 3, wherein the phthalocyanine is cobalt phthalocyanine and the threshold temperature is about 30° C.

6. The process of claim 3 wherein in a process further comprises:

providing the combustion gases from a fuel burner;

comparing the electric signal with a predetermined signal threshold; and triggering an alarm signal when the electric signal exceeds the signal threshold, whereby correct operation of the fuel burner can be checked.

7. The process of claim 3 wherein in a process further comprises:

providing the combustion gases from a fuel burner;

contacting the layer with the combustion gases in a conduit of the fuel burner in which circulate the combustion gases; and sending the electric signal into an open-loop which controls an automatic obturation means in the conduit for supplying the fuel burner with combustion air or fuel and which automatically regulates a ratio of the air to the fuel, whereby the electric signal is minimum at optimum combustion.

8. The process of claim 3 wherein in a process further comprises:

providing the combustion gases from an internal combustion engine;

contacting the layer with the combustion gases in a conduit branch-connected to an exhaust conduit of said engine; and sending the electric signal into an open-loop which controls an automatic obturation means in an air supply circuit or in a fuel supply circuit of said engine and which automatically regulates a ratio of the air to the fuel, whereby said electric signal corresponds to optimum operation of said engine.

9. The process of claim 3, and further comprising contacting the layer with the combustion gases from a burner burning successively a fuel and a known standard gas, and using the general nature of the combustion gases detected therefrom for calculating therefrom calorific power of the fuel.

10. The process according to claim 3, wherein the second temperature is higher than the temperature corresponding to the point of convergence.

11. The process of claim 3, wherein said layer comprises an insulating wafer having a film of a suspension of particles of metallic phthalocyanines applied thereon with a hydrophobic material dissolved in a solvent selected from the group of carbon tetrachloride, ether or acetone whereby said solvent is evaporated to provide a semi-conducting film that is insensitive to the humidity of the combustion gases.

12. A detector for detecting a general nature of combustion gases that contain water vapor, comprising:

a layer consisting essentially of metallic phthalocyanine for placement in contact with combustion gases that contain water vapor;

a first electrode on a first portion of the layer and a second electrode on a second portion of the layer that is spaced from the first portion of the layer, whereby to be able to collect from the electrodes an electric signal that varies as a function of a general nature of the combustion gases; and thermal means for maintaining the temperature of the layer lower than 95° Celsius and higher than a threshold temperature predetermined as a function of the phthalocyanine, the threshold temperature being lower than a predetermined temperature of a point of convergence of curves representing variations in resistance of the layer as a function of the reciprocal of its temperature expressed in degrees Celsius for different hygrometric degrees.

13. The detector of claim 12, and further comprising a wafer made of an insulating material on which are deposited the two electrodes and the layer of the metallic phthalocyanine, the thermal means comprising an electric heating resistor on the wafer for connection to a source of voltage.

14. The detector according to claim 12, wherein the temperature of the layer higher than the temperature corresponding to the point of convergence.

* * * * *